United States Patent [19]

Kishi et al.

[11] 4,366,475
[45] Dec. 28, 1982

[54] IMAGE DISPLAY SYSTEM

[75] Inventors: Hajimu Kishi, Hino; Kunio Tanaka, Hachioji both of Japan

[73] Assignee: Fujitsu Fanuc Limited, Tokyo, Japan

[21] Appl. No.: 236,552

[22] Filed: Feb. 20, 1981

[30] Foreign Application Priority Data

Feb. 23, 1980 [JP] Japan .................................. 55-21816

[51] Int. Cl.³ .............................................. G09G 1/16
[52] U.S. Cl. .................................. 340/731; 340/711; 364/521
[58] Field of Search ........................ 340/711, 712, 731

[56] References Cited

U.S. PATENT DOCUMENTS

| | | | |
|---|---|---|---|
| 3,668,685 | 6/1972 | Horvath | 340/731 X |
| 3,786,475 | 1/1974 | Staar | 340/711 |
| 3,911,420 | 10/1975 | Lampson | 340/731 |
| 4,070,710 | 1/1978 | Sukonick et al. | 340/711 X |
| 4,107,662 | 8/1978 | Endo et al. | 340/731 |

FOREIGN PATENT DOCUMENTS 54-161841 12/1979 Japan ................................... 340/731

OTHER PUBLICATIONS

Bordogna, Kutenplon; The Raycomp-100, A Video Page Composition Terminal; Electronic Progress, vol. 18, No. 2, pp. 15-22, Summer 1976.

*Primary Examiner*—David L. Trafton
*Attorney, Agent, or Firm*—Staas & Halsey

[57] ABSTRACT

An image display system suitable for use in displaying, at an enlarged scale, any desired portion of an image presented on a picture surface of a display apparatus, or in displaying, in a reduced scale, the whole portion of the image presented on the picture surface. The picture surface is divided into sub-regions arranged in m lines and n columns. Sub-region appointing numeral keys are arranged to correspond to these sub-regions, so that any desired sub-region is appointed by a depression of the corresponding appointing keys, thus designating that to make the image portion in the appointed sub-region be enlarged and displayed over the entire area of the picture surface or that the whole part of the image on the display surface be reduced and displayed in the appointed sub-region of the picture surface.

15 Claims, 19 Drawing Figures

IMAGE DISPLAY SYSTEM

BACKGROUND OF THE INVENTION

The present invention relates to an image display system and, more particularly, to an image display system capable of easily performing an enlargement and reduction of scale of an image formed on the image surface of a graphic display apparatus.

The graphic display apparatus has a variety of uses as means for realizing various techniques using computers such as CAD (Computer-Aided-Design), CAM (Computer-Aided Manufacture) and the like. For instance, the graphic display apparatus is effectively utilized in instantaneously drawing the locus of movement of a tool or the shape of the work, in the operation of NC (Numerical Control) machine tool to permit the check of NC processing program.

In the use of the graphic display apparatus for displaying an image, it is an indispensable function to be able draw the picture of any desired portion of the image at any desired magnification. To this end, it is necessary to appoint the region of the image to be displayed at an enlarged or reduced scale, as well as the magnification.

Hitherto, this appointment has been made either by (1) directly appointing the region on the image surface with a light pen, a joy stick or a tablet or by (2) inputting numerical data concerning the coordinate values of the region to be displayed and the magnification through a keyboard.

The first appointing method (1) however, is impractical in that it requires an expensive light pen, tablet or the like. The second appointing method (2) is also defective in that it requires a highly complicated and troublesome operation for inputting the coordinate information and that the appointment of the region cannot be made promptly.

In the techniques concerned with the image display, particularly in the NC processing or machining, it is desirable to display, simply, rapidly and at low cost, only the desired portion of the image at an enlarged or reduced scale. Unfortunately, the aforementioned conventional appointing methods (1) and (2) fail to meet this requirement.

Accordingly, there is an increasing demand for an image display system which can easily and rapidly appoint the region of the image to be displayed and enlarge or reduce the scale at which the image is displayed.

SUMMARY OF THE INVENTION

It is, therefore, a an object of the invention to provide an image display system which permits any desired region on the image surface to be appointed by quite an easy operation.

More specifically, it is an object of the invention to provide an image display system which permits any desired region of the image on an image surface to be appointed and displayed at an enlarged or reduced scale by quite an easy manipulation.

It is another object of the invention to provide an image display system which permits any desired region of image on a picture surface to be appointed promptly and displayed at an enlarged or reduced scale.

It is still another object of the invention to provide an image display system in which any desired region of the image on a picture surface is appointed and displayed at an enlarged or reduced scale by a simple manipulation of a ten-key type input device.

It is a further object of the invention to provide an image display system which permits the operator to easily understand the relationship between the keys for appointing the regions of the image and the regions of image on a picture surface.

It is a still further object of the invention to provide an image display system in which the keys for inputting the data can be used also as keys for appointing the regions of image on a picture surface.

Other features and advantages of the invention will be apparent from the following description of the preferred embodiments taken in conjunction with the accompanying drawings.

DESCRIPTION OF THE PREFERRED EMBODIMENTS

The outline of the enlargement and reduction of the scale of the display in accordance with the invention will be described hereunder with reference to FIGS. 1, 2 and 3.

Figure 1:
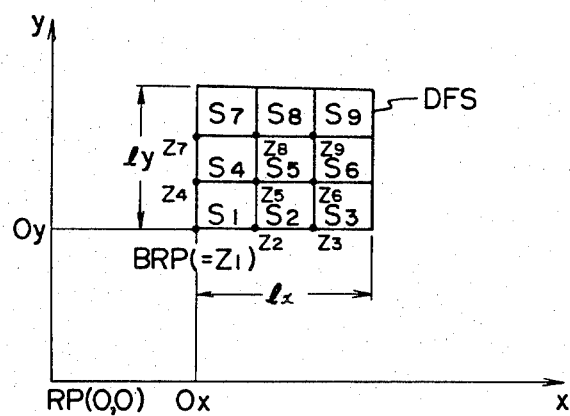
FIG. 1 is an illustration of the relationship between the picture surface and the sub-regions and is useful for the explanation of the principle of the invention.

Referring first to FIG. 1 showing the relationship between the CRT surface (picture surface) and sub-regions, the CRT surface (picture surface) DFS of a graphic display device is divided into 9 sub-regions $S_1$, $S_2$, ... $S_9$, which are arranged in three columns and three lines as illustrated.

A symbol RP represents the origin point of the image on a two-dimensional coordinate system. Namely, the point RP is determined as the point (O,O) on the coordinate system. Similarly, a symbol BRP represents the origin point of a picture on the two-dimensional coordinate system, given as the point (Ox,Oy). Symbols $Z_1$ thru $Z_9$ represent the reference points or origins of respective sub-regions $S_1$ thru $S_9$. Symbols lx and ly represent, respectively, the lengths of the picture surface in the line direction (X-axis direction) and column direction (Y-axis direction). The sub-region Si can be specified by the suffix i (i=1, 2, . . . , 9). The arrangement is such that the desired sub-region Si is put on display as the corresponding key i of a ten-key type input device is depressed.

Figure 2:
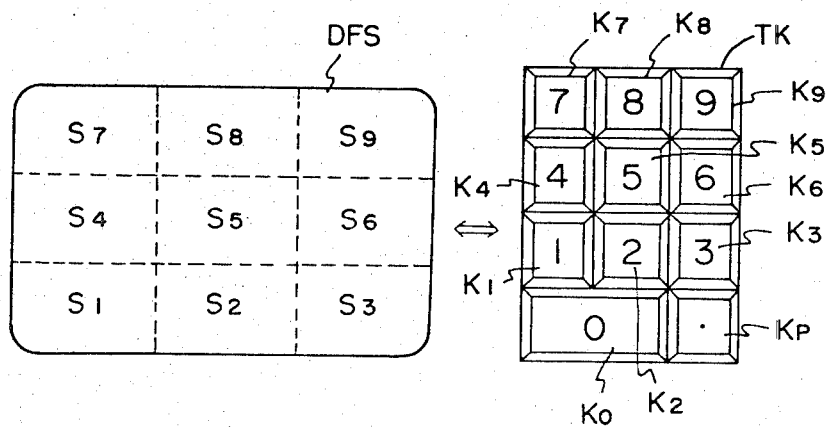
FIG. 2 is an illustration of the relationship between the sub-regions of the picture surface and the ten-key type input device.

FIG. 2 is an illustration of the relationship between the sub-regions Si of the picture surface CRT and the keys of the ten-key type input device TK. The ten-key type input device TK includes a "0" key K0, "1" key $K_1$, "2" key $K_2$, . . . "9" key $K_9$ and a decimal point key Kp. The "i" key $K_i$ corresponds to the sub-region $S_i$, so that any desired sub-region $S_i$ is appointed when the corresponding key $K_i$ is depressed.

It is to be noted here that the arrangement of the sub-regions on the picture surface, i.e. the lines and columns of the sub-regions, perfectly corresponds to the arrangement of the keys, so that the appointment of the sub-region to be displayed at an enlarged or reduced scale can be made in quite an easy way. The "0" key K0 and the decimal point key Kp are used also as an input keys for inputting a magnification order of "3 times" and "⅓ time", respectively. Needless to say, it is possible to provide an input key or keys for inputting any suitable magnifications.

Figure 3:
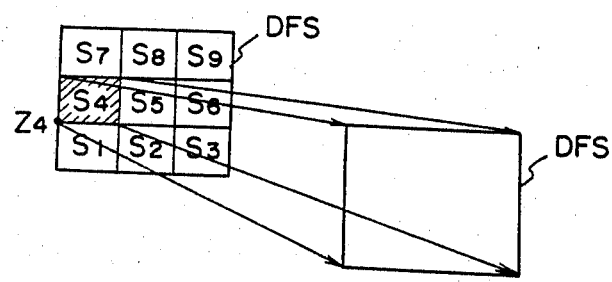
FIGS. 3(a) and 3(b) are illustrations of the principles of operation in accordance with the invention for enlarging and reducing, respectively, the scale at which the sub-region is displayed.
Figure 3:
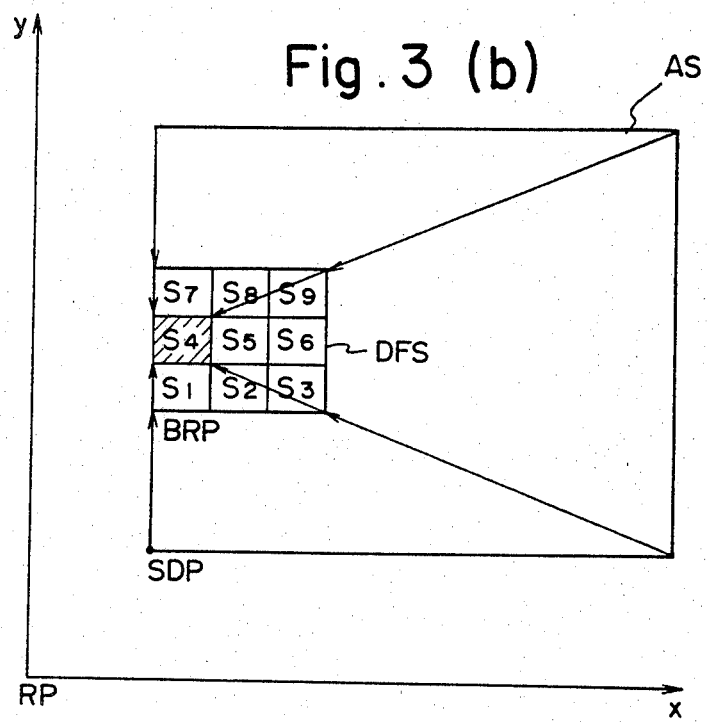
Figure 5:
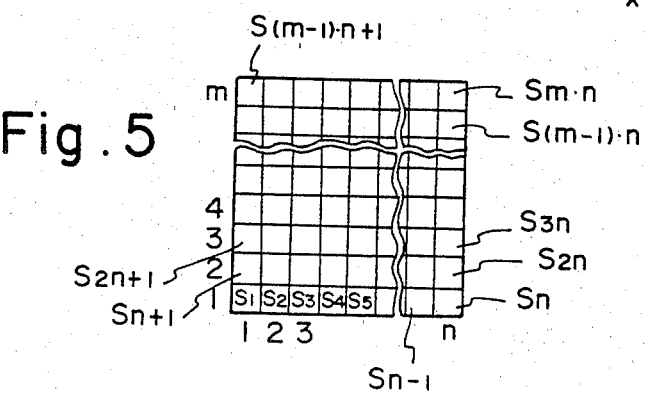
FIG. 5 shows a sub-region arrangement in accordance with another embodiment of the invention.

FIG. 3 comprising 3(a) and 3(b) illustrates how the scale of display of the image is enlarged or reduced in the image display system of the invention.

For displaying a specific portion of the image at the enlarged scale, the sub-region involving the above-mentioned portion of the image is appointed by the depression of a corresponding key. As a result, as will be seen from FIG. 3(a), the image portion in the sub-region $S_i$ ($S_4$ in the illustrated example) is displayed to occupy the whole area of the picture surface DFS, with the reference point $Z_4$ constituting the new origin point of the picture. In this state, the image portion in the sub-region Si of the original image is increased by three times in both of line and column directions. In contrast, when displaying a specific portion of the image at reduced scale, the image displayed on the whole area of the picture surface DFS is shown at a scale reduced to ⅓ in both of line and column directions, on the sub-region $S_i$ ($S_4$ in the illustrated example) on the picture surface, as the sub-region $S_i$ is appointed. Consequently, the whole image spreading over the entire area of the region AS defined by thick lines is displayed to occupy the whole part of the picture surface DFS, at a size reduced to ⅓ in both line and column directions, as will be seen from FIG. 3(b). It will be seen that the area of the region AS is 9 times as large as the area of the picture surface DFS.

According to the invention, the operation for displaying the image portion of the sub-region $S_4$ at a magnification 3 over the entire area of the picture surface DFS is conducted in a procedure having the steps of: —1— depression of numeral key $K_4$ corresponding to the designated sub-region $S_4$, —2— depression of "0" key $K_0$ and —3— depression of execution key (not shown) for instructing the execution of enlargement or reduction of the scale of display.

In contrast, the operation for displaying the image occupying the whole area of the picture surface DFS at a scale reduced to ⅓ in the sub-region $S_4$ as shown in FIG. 3b is conducted by a process having the steps of: (1) depression of the numeral key $K_4$ corresponding to the designated sub-region $S_4$, (2) depression of the decimal point key Kp and (3) depression of the execution key.

Namely, according to the invention, the operation for displaying the desired portion of the image at an enlarged scale is conducted by the process having the following steps:

1. depression of the numeral key corresponding to the sub-region to which the portion of the image to be displayed at an enlarged scale belongs,
2. depression of the "0" key $K_o$ for enlarging the scale, and
3. depression of the execution key.

In contrast, the operation for displaying the image at a reduced scale is conducted by the process having the following steps:

1. depression of the numeral key corresponding to the sub-region in which the reduced image is to be put;
2. depression of the decimal point key Kp for the reduction of scale; and
b 3. depression of the execution key.

In the display of the image at an enlarged or reduced scale, once the new picture origin point is determined by the inputting of the region to which the image portion to be displayed at enlarged scale belongs or the region in which the image of reduced scale is to be put, the display at enlarged or reduced scale as shown in FIG. 3(a) or 3(b) is achieved in a known graphic display technique. In the case of the display at the enlarged scale as shown in FIG. 3(a), the reference point $Z_4$ constitutes the new picture origin point, while, in the display at reduced scale shown in FIG. 3(b), the point SDP constitutes the new picture origin point.

Figure 4:
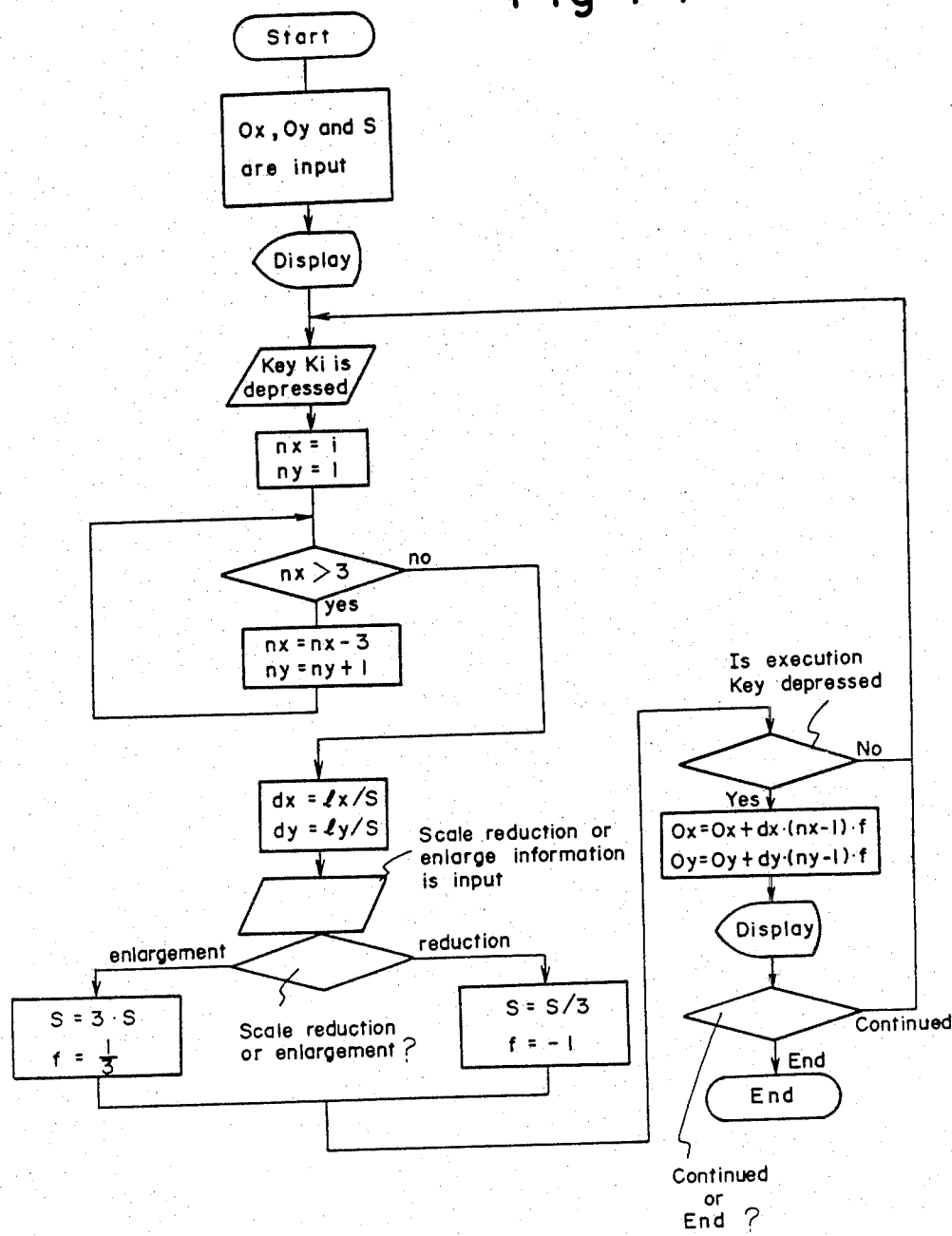
FIG. 4 is a flow chart of processing performed by a display system in accordance with an embodiment of the invention.

FIG. 4 shows a flow chart of the process for determination of the new picture origin point by the appointment of the sub-region Si through the aforementioned ten-key type input device TK.

First of all, the data concerning the initial picture origin point (Ox, Oy) and the desired magnification S is input to make the picture surface DFS display the image in accordance with the picture information corresponding to this input. (FIG. 1)

Thereafter, operations are executed for displaying the image portion in the predetermined sub-region at an enlarged scale or for displaying an image at a reduced scale in the predetermined sub-region as shown in FIGS. 3(a) and 3(b). To this end, a numeral key $K_i$ corresponding to the designated sub-region is depressed (See FIG. 2). In consequence, the position of the reference point ($n_x$, $n_y$) of the aforementioned sub-region is calculated on an assumption of $n_x=i$ and $n_y=1$.

Namely, an arithmetic operation is made to determine to what line and column the designated sub-region belongs. Since the picture surface is divided into 9 sub-regions arranged in three lines and three columns, a judgement is made at first as to whether the $n_x$ (=i) is greater than 3. If $n_x$ is not greater than 3 ($n_x \leq 3$), the sub-region appointed by the numeral key $K_i$ is the sub-region which is located in the first line and the i th column. If $n_x$ (=i) is greater than 3 ($n_x > 3$), the sub-region appointed by the numeral key $K_i$ is the sub-region which is located in the second or third line. In this case, arithmetic operations of $(n_x-3) \rightarrow$ new $n_x$ (namely, $(i-3) \rightarrow$ new $n_x$) and $(n_y+1) \rightarrow$ new $n_y$ (namely, $(1+1) \rightarrow$ new $n_y$) are conducted to make a judgement as to the new $n_x$, i.e. a judgement as to whether $n_x(=i-3)$ is greater than 3. If $n_x$ is not greater than 3 ($n_x \leq 3$), the sub-region appointed by the numeral key $K_i$ is the region in the second line and $(i-3)$th column. However, when the $n_x(=i-3)$ is greater than 3 a second time, the sub-region appointed by the numeral key $K_i$ is the one which is in the third line. In this case, arithmetic operations of $(n_x-3) \rightarrow n_x$, i.e. $[(i-3)-3] \rightarrow$ new $n_x$ and $(n_y+1) \rightarrow$ new $n_y$, i.e. $(2+1) \rightarrow$ new $n_y$ are conducted. As a result, the new $n_x$ is not greater than 3 ($n_x \leq 3$), so that it is judged that the sub-region appointed by the numeral key $K_i$ is of the line $n_y$ (third line) and column $n_x$ (line $i-6$).

In the case where the portion of the original image is displayed at the enlarged scale, the picture surface DFS has insufficient display capacity for the original image. To the contrary, the display capacity is excessively large when the original image is displayed at the reduced scale.

Therefore, the lengths in line and column directions of each sub-region on the image surface, before the enlargement or reduction of the scale at magnification S, are calculated as follows:

$$d_x = lx/S \quad (1)$$

$$d_y = ly/S \quad (2)$$

Then, the scale enlargement information or scale reduction information is input together with the magnification information S. In the illustrated embodiment, however, the scale enlargement information or the scale reduction information is input solely, because the magnification S is fixed at 3 and ⅓ for the scale enlargement and scale reduction, respectively. Consequently, an arithmetic operation of $3 \times S \rightarrow$ new S is performed in the case of the scale enlargement, whereas, in the case of the scale reduction, an arithmetic operation of $S/3 \rightarrow$ new S is performed. At the same time, an origin point calculation factor $f = \frac{1}{3}$ is set in the case of the scale enlargement, while an origin point calculation factor $f = -1$ is set in the case of the scale reduction.

Then, as the execution key is depressed, calculations are performed as follows to determine the new picture origin point.

$$O_x + d_x \cdot (n_x - 1) \cdot f \rightarrow O_x \quad (3)$$

$$O_y + d_y \cdot (n_y - 1) \cdot f \rightarrow O_y \quad (4)$$

Thereafter, the display at enlarged or reduced scale is performed by a known method, in accordance with the above-mentioned new picture origin point $(O_x, O_y)$, new magnification S and the picture information of the picture memory using this new origin point as the starting point.

In the described embodiment, the picture surface DFS is divided into 9 sub-regions arranged in three lines and three columns, so that the magnification is 3 and ⅓, respectively, in the cases of the scale enlargement and scale reduction.

The above-mentioned magnification, however, is not exclusive and it is possible to obtain any desired magnification by dividing the picture surface into sub-regions arranged in m lines and n columns. In such a case, the sub-region of line i and column j is specified by a numerical code of $$N = [(i-1)n + j] \quad (3)$$

Figure 6:
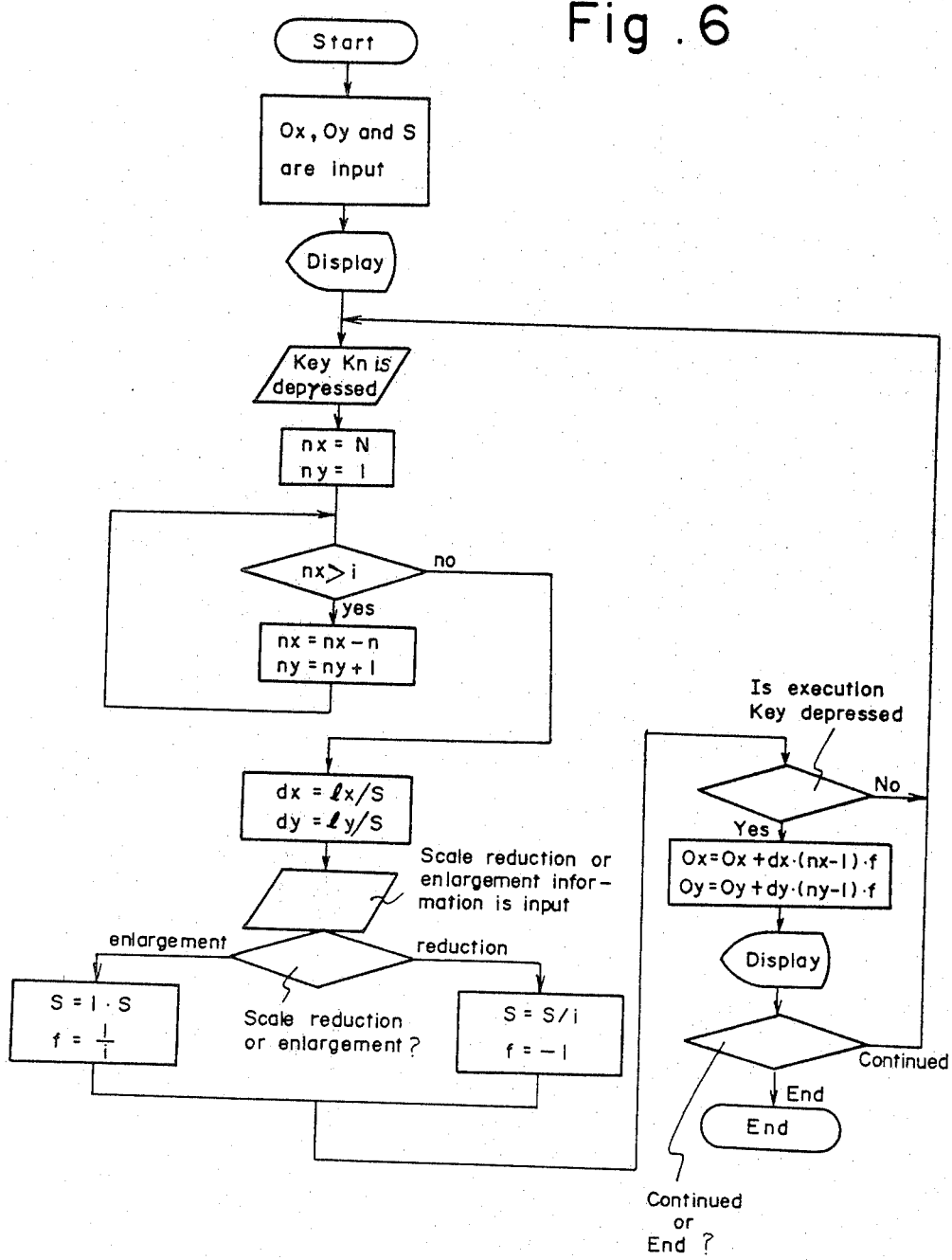
FIG. 6 shows a flow chart of processing performed by a display system in accordance with another embodiment of the invention.

Therefore, the appointment of the sub-region is achieved by inputting the above-mentioned numerical code N which specifies the sub-region, and the new picture origin point $(O_x, O_y)$ and magnification S are calculated in a series of operations shown by the flow chart in FIG. 6. Since the flow chart shown in FIG. 6 is materially identical to that shown in FIG. 4 except that the flow chart in FIG. 6 is utilized in the case that the picture surface is generally divided into sub-regions arranged in m lines and n columns, it seems that there is no necessity for the explanation of the flow chart shown in FIG. 6. Herein, m and n are arbitrary numeric integers, respectively.

If the number of lines (m) equals to the number of columns (n), a magnification of m and 1/m is obtained for each case of the scale enlargement and scale reduction. Namely, in the case of the scale enlargement, the portion of the image shown in a sub-region is displayed at an enlarged scale to occupy the whole area of the picture surface, whereas, in the case of the scale reduction, the image occupying the whole area of the image surface is reduced in size to occupy only the specified sub-region in the picture surface.

Figure 7:
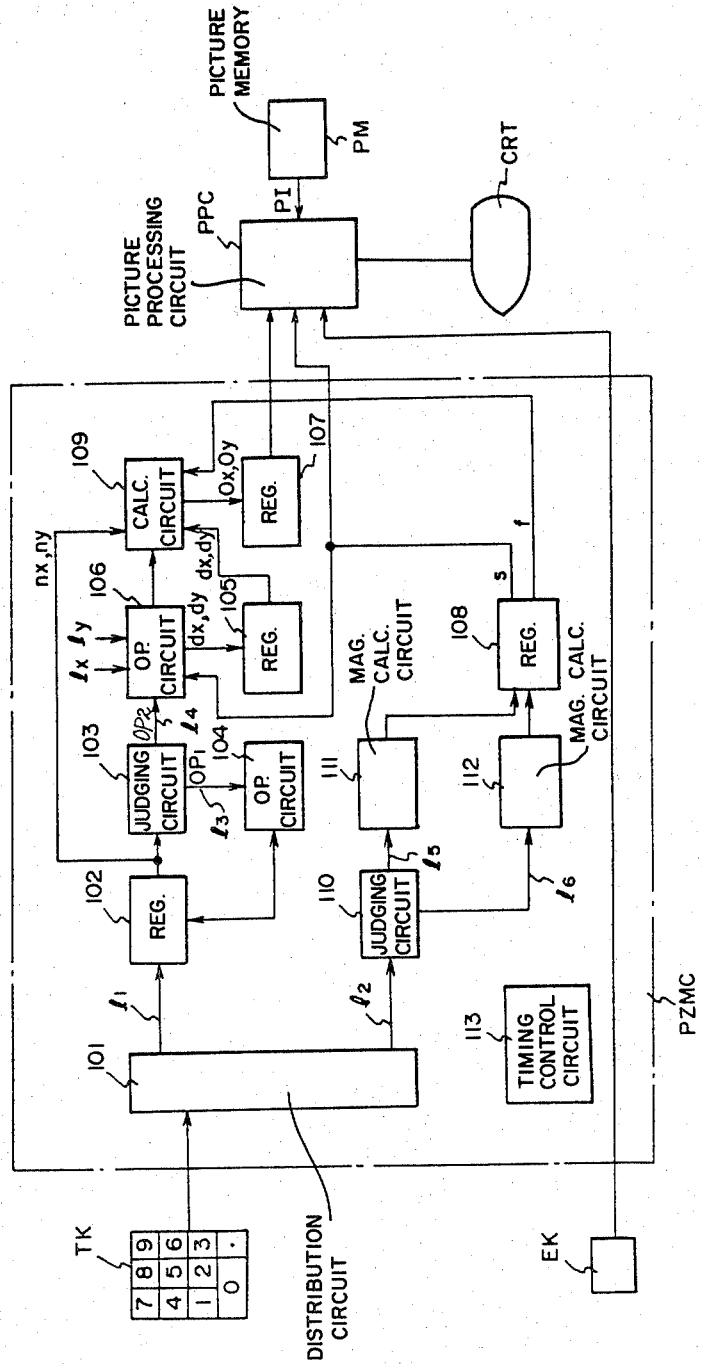
FIG. 7 is a block diagram of a display system in accordance with an embodiment of the invention.

FIG. 7 is a circuit block diagram of the calculation means for calculating the picture origin point and magnification, in accordance with another embodiment of the invention.

In FIG. 7, symbols TK, EK and CRT represent, respectively, a ten-key type input device, an execution key and a cathode ray tube having the picture surface. A picture memory is represented by a symbol PM. A picture processing circuit PPC constructed to make a display of the picture at a predetermined scale on the cathode ray tube CRT, in accordance with information concerning the picture origin point $(O_x, O_y)$, magnification S and picture information PI, upon depression of the execution key EK.

A symbol PZMC represents a circuit for calculating the picture origin point and magnification. Namely, the circuit PZMC performs the arithmetic operations and judgements of the flow chart shown in FIG. 4 to determine the new picture origin point $(O_x, O_y)$ and the new magnification S.

The circuit PZMC includes a distribution circuit 101 which is constructed to determine whether the depressed key is a numeral key (one of the keys "1" to "9") or a magnification key (either "0" key or decimal point key) and, when the depressed key is a numeral key, supplies a numeral code ($1 \leq i \leq 9$) to a line $l_1$ and "0" or decimal point code to the line $l_2$ when the depressed key is the "0" key or the decimal point key. A reference numeral 102 designates a register in which $n_x = i$ and $n_y = 1$ are set when the numeral i is delivered to the line $l_1$, while a numeral 103 designates a judging circuit which is adapted to deliver an operation command signal $OP_1$ to a line $l_3$ when $n_x$ is greater than 3 ($n_x > 3$) and an operation command $OP_2$ to a line $l_4$ when $n_x$ is not greater than 3 ($n_x \leq 3$). A reference numeral 104 designates an operation circuit for calculating the new origin point $n_x, n_y$. More specifically, this circuit 104 performs a calculation of $(n_x - 3)$, $(n_y + 1)$ using the numerical values $n_x, n_y$ set in the register 102, upon receipt of the operation command signal $OP_1 = "1"$ (high level), and sets the new $n_x$ and new $n_y$ in the register 102. A reference numeral 105 designates a register adapted to memorize the $d_x$ and $d_y$, while a numeral 106 denotes an operation circuit for calculating the $d_x$ and $d_y$ upon receipt of the operation command signal $OP_2=$"1" (high level). A register 107 is constructed to memorize the picture origin point $(O_x, O_y)$, while a register 108 is constructed to memorize the magnification S (scale enlargement or scale reduction) and the origin point calculation factor f. A reference numeral 109 designates a picture origin point calculation circuit constructed for determining the new picture origin point through performing the operations shown by equations (3) and (4), and setting the thus determined origin point in the register 107. A reference numeral 110 designates a judging circuit constructed to make a judgement as to whether the code delivered to the line $l_2$ is the "0" code or the decimal point code. This judging circuit 110 delivers a signal "1" to a line $l_5$ when the code delivered to the line $l_2$ is the "0" code, and a signal "1" to a line $l_6$ when the delivered code is the decimal point code.

A reference numeral 111 designates a magnification calculation circuit constructed to perform an arithmetic operation of $S/3=S$ and generate origin point calculation factor f when the signal "1" is delivered to the line $l_6$. The thus calculated origin point calculation factor f and the new magnification S are memorized in the resistor 108. A reference numeral 113 designates a control circuit adapted to control the timings of arithmetic operations and judgements in respective circuits, through a control line which is not shown.

In operation, after a depression of a numeral key $K_i$ for appointing the sub-region, the "0" key or the decimal point key is depressed to give an order for scale enlargement or reduction and, thereafter, the execution key EK is depressed.

Consequently, the circuit PZMC for calculating the picture origin point and magnification makes judgements and arithmetic operations in accordance with the flow shown by the flow chart in FIG. 4, under the control of the controller 113, while the picture processing circuit PPC conducts known processing in accordance with the new picture origin point $(O_x, O_y)$, new magnification S and the picture information PI, to make the display on the cathode ray tube CRT at an enlarged or reduced scale.

Figure 8:
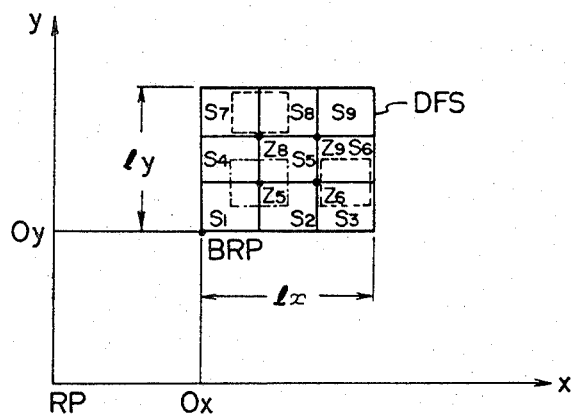
FIG. 8 is an illustration of the relationship between the image surface and sub-regions in accordance with still another embodiment of the invention.

FIG. 8 shows the outline of the scale enlargement and scale reduction in accordance with another embodiment of the invention. A symbol DFS represents the CRT (picture surface) incorporated in a graphic display apparatus. The picture surface DFS is divided into 9 sub-regions $S_1$ to $S_9$ of an equal size arranged in three lines and three columns. In this embodiment, there is a concept of an imaginary sub-region. Namely, an imaginary sub-region is the region which has the same shape as the sub-region and has a neutral or central line which coincides with the border line between two adjacent sub-regions, as shown by the broken line. Also, an area having the same shape as the sub-region and centered at the point of contact between two diagonally contacting two sub-regions (reference points $Z_5, Z_6, Z_8, Z_9$) is referred to as an imaginary sub-region. A symbol BRP represents the picture origin point $(O_x, O_y)$ on a two-dimensional coordinate system, whereas RP represents the origin point of the original image given as the point (O,O) of the coordinate system. Symbols $l_x$ and $l_y$ represent the lengths of the picture surface in the line direction (X-axis direction) and column direction (Y-axis direction).

The embodiment shown in FIGS. 1 to 7 is adapted to enlarge the image portion in a specific sub-region to the size occupying the whole area of the picture surface or to reduce the image occupying the whole area of the picture surface into a size occupying the specified region of the picture surface. In contrast, the embodiment described in connection with FIG. 8 permits an appointment of an imaginary sub-region, so that the image portion in the imaginary sub-region is enlarged to occupy the whole area of the picture surface or, alternatively, the image spread over the entire area of the picture surface is reduced in size and displayed in the appointed sub-region.

Figures 9A, 9B, 9C, 9D:
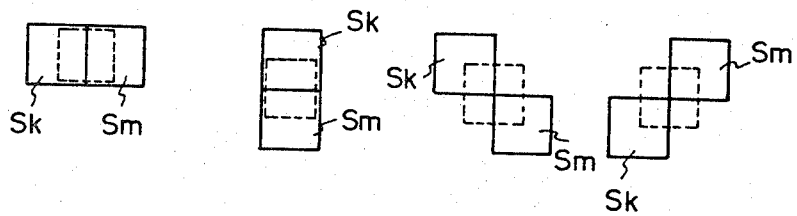
FIGS. 9(a) through 9(f) are illustrations explanatory of the imaginary sub-regions in still another embodiment of the invention.
Figures 9E, 9F:
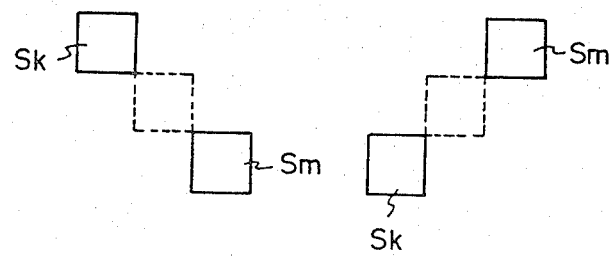

The appointment of the imaginary sub-region is made by appointing two sub-regions between which the designated imaginary sub-region is located. FIG. 9 shows how to appoint the imaginary sub-region. It will be seen that the imaginary sub-region as shown by the broken line is appointed by successive inputting of the sub-regions $S_k$ and $S_m$. The sub-region $S_i$ is specified by the numerical value i. Namely, the sub-region $S_i$ is input by a depression of the key $K_i$ of the ten-key type input device.

Namely, the display of the image at an enlarged scale is made by the following procedure.
1. depression of the numeral key $K_k$ corresponding to one $S_k$ of the sub-regions between which the designated imaginary region is located;
2. depression of the key $K_m$ corresponding to the another $S_m$ of the sub-regions;
3. depression of "0" key $K_o$ for giving an order for display at enlarged scale; and
4. depression of the execution key EK.

Similarly, the display of the image at a reduced scale is made by the following procedure:
1. depression of numeral key $K_k$ corresponding to one $S_k$ of the sub-regions disposed at both sides of the imaginary sub-region in which the image of the reduced size is to be put;
2. depression of the numeral key $K_m$ corresponding to another $S_m$ of the sub-regions;
3. depression of the decimal point key $K_p$ for giving an order for display of the image at reduced scale; and
4. depression of the execution key.

Figure 10:
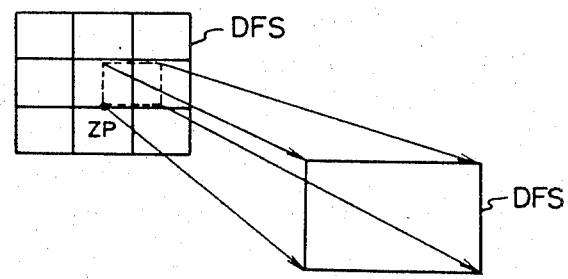
FIGS. 10a and 10b are illustrations of the principles of operation for enlarging and reducing, respectively, the scale at which the imaginary sub-region is displayed, in accordance with still another embodiment of the invention.
Figure 10:
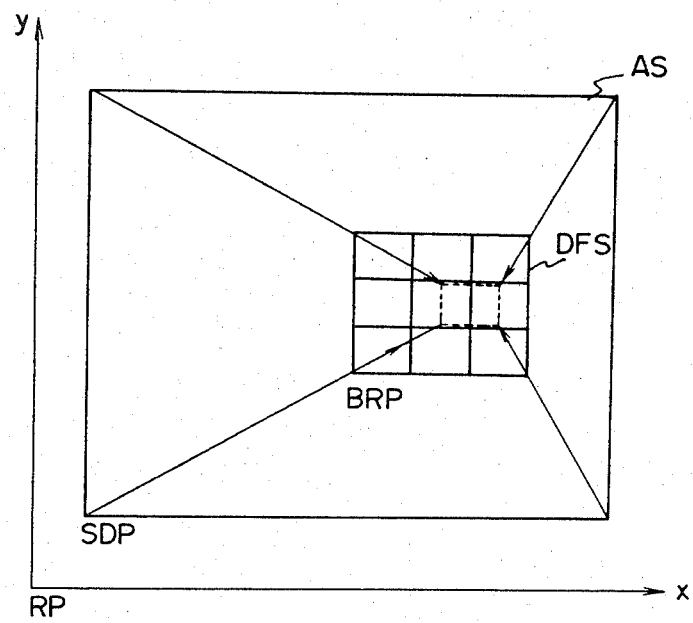

In the enlargement of the image of the imaginary sub-region or in the reduction of the image into the imaginary sub-region, the display at enlarged scale or reduced scale is made as shown in FIG. 10(a) or 10(b), by the known graphic display technique, once the new picture origin point is determined. For information, in the case of the scale enlargement as shown in FIG. 10(a), the point ZP constitutes the new picture origin point, whereas, in the scale reduction as shown in FIG. 10(b), the point SDP constitutes the new picture origin point.

Figure 11:
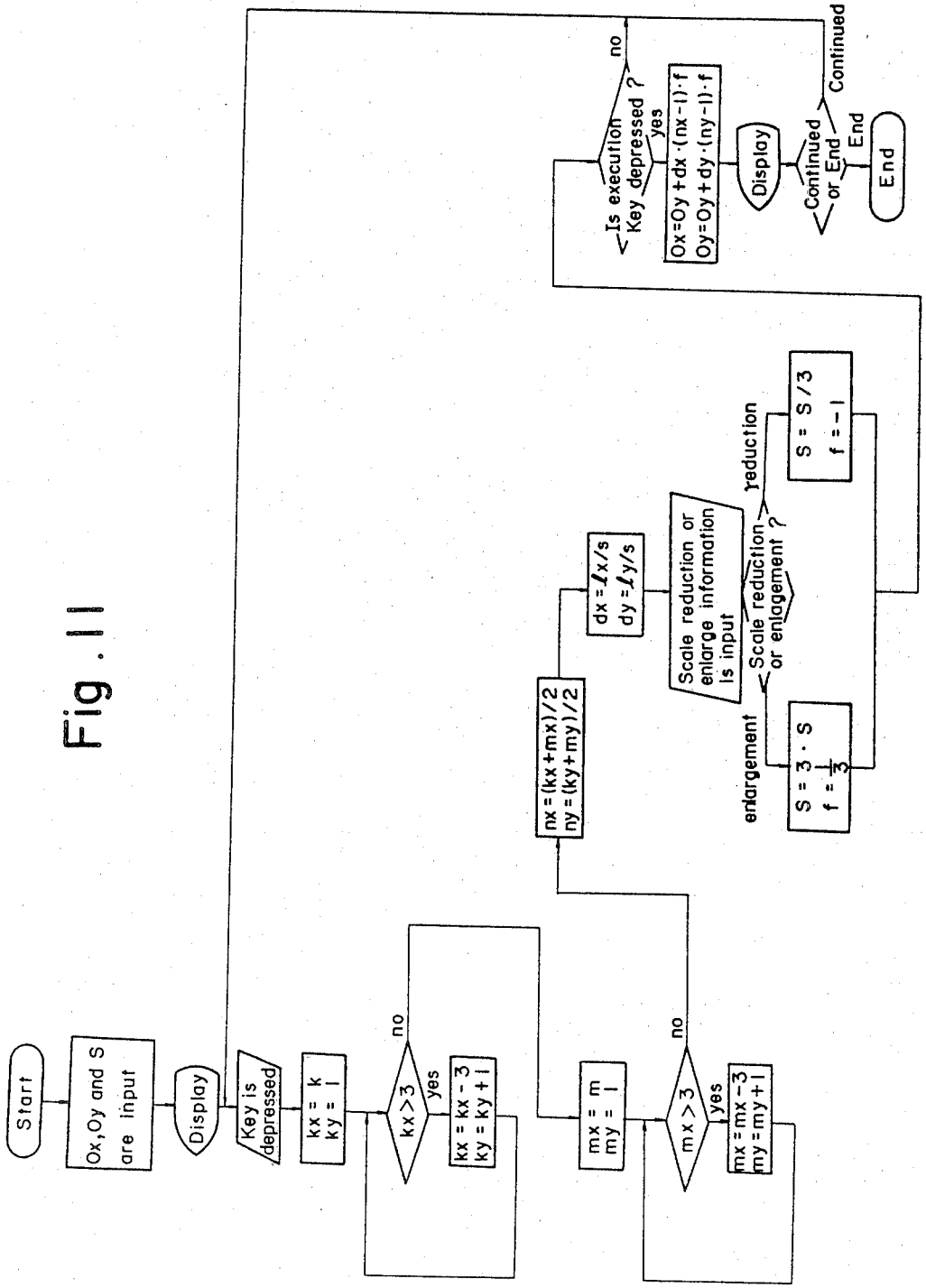
FIG. 11 shows a flow chart of processing performed by a display system in accordance with still another embodiment of the invention.

FIG. 11 shows the flow chart of a process in which the picture origin point is determined when the designated imaginary sub-region is appointed by the inputting of two sub-regions $S_m$ and $S_k$ (m,k=1,2 ... 9) by means of the ten-key type input device.

First of all, the initial picture origin point $(O_x, O_y)$ and magnification S are input to display the image on the picture surface DFS in accordance with the picture information memorized in the picture memory.

Then, the image shown in the sub-region is enlarged or the image shown over the entire area of the picture surface is reduced in scale and shown in the appointed imaginary sub-region, as shown in FIGS. 10(a) and 10(b). To this end, the numeral key $K_k$ corresponding to one $S_k$ of the two regions $S_k, S_m$ (FIG. 9) disposed at both sides of the imaginary sub-region is depressed. In consequence, an arithmetic operation similar to that shown in FIG. 4 is performed on the assumption of $K_k=k$ and $K_y=1$ to determine the line and column to which the sub-region $S_k$ belongs.

Thereafter, the numeral key $K_m$ corresponding to the sub-region $S_m$ is depressed, so that the line and column to which the sub-region $S_m$ belongs are determined, on an assumption of $m_x=m$ and $m_y=1$.

After the completion of the above-explained arithmetic operation, the following arithmetic operations are performed.

$$n_x = (k_x + m_x)/2 \quad (5)$$

$$n = (k_y + m_y)/2 \quad (6)$$

Thereafter, the new magnification S and the new picture origin point $(O_x, O_y)$ are calculated in accordance with the flow chart shown in FIG. 11 to permit the display at the enlarged or reduced scale.

Although the picture surface DFS in this embodiment also is divided into 9 sub-regions arranged in 3 lines and 3 columns to provide magnifications of 3 and ⅓, respectively, for the scale enlargement and reduction, this is not exclusive and the picture surface may be divided into sub-regions arranged in m lines and n columns to provide any desired magnification.

Figure 12:
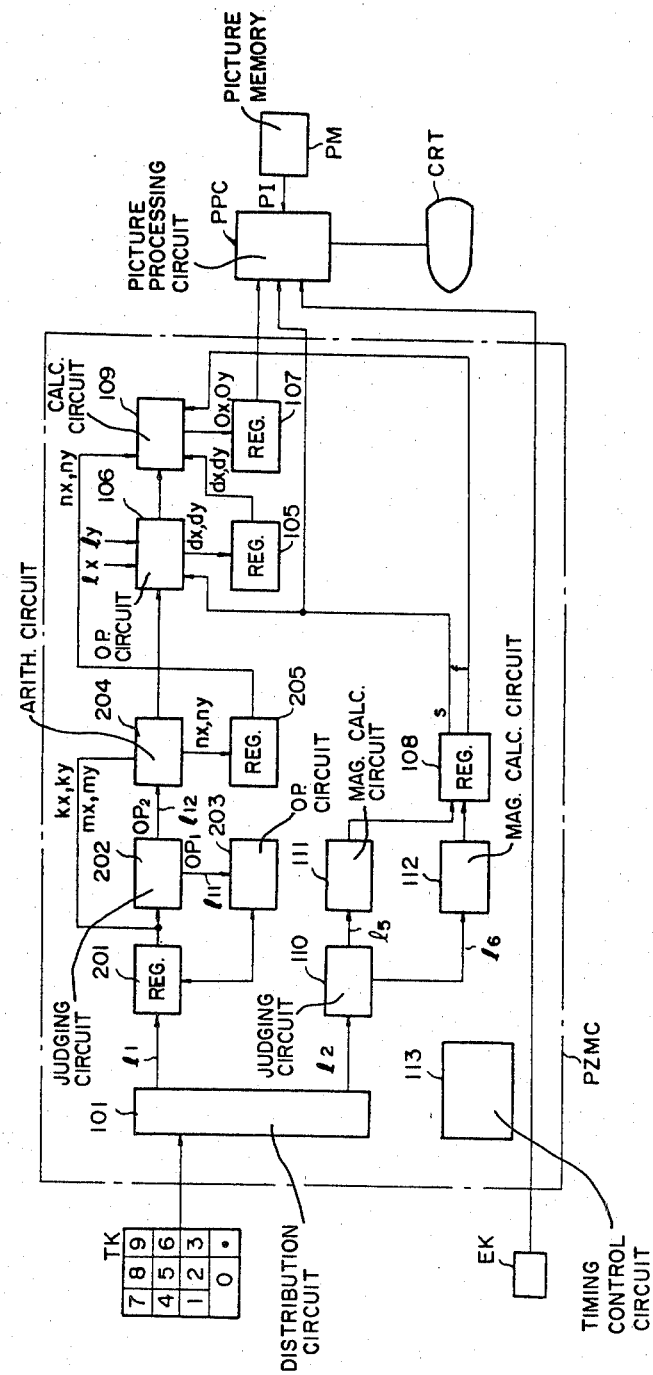
FIG. 12 is a block diagram of the display system in accordance with still another embodiment of the invention.

FIG. 12 shows the block diagram of the circuit for calculating the new picture origin point and magnification. In this Figure, the same reference numerals are used to denote the same parts as those shown in FIG. 7.

A reference numeral 201 designates a register adapted to memorize $k_x, k_y, m_x$ and $m_y$. This register makes a setting of $k_x=k$, $k_y=1$ ($mx=m$, $my=1$) when the line 1 receives a numerical value k(m), and memorizes the thus calculated $k_x, k_y, m_x$ and $m_y$. A reference numeral 202 denotes a judging circuit which is adapted to make a judgement as to whether the $k_x(m_x)$ is greater than 3, i.e. $k_x > 3(m_x > 3)$ amd delivers, when the condition of $k_x > 3(M_x > 3)$ is satisfied, an operation command signal $OP_1$ to a line $l_{11}$. When this condition is not met, i.e. in the case of $k_x \leq 3(m_x \leq 3)$, this circuit delivers an operation command signal $OP_2$ to a line $l_{12}$.

A reference numeral 203 designates a circuit for calculating the new $k_x, k_y$ (new $m_x, m_y$). Namely, this circuit makes arithmetic operations of $(k_x-3)$, )$k_y+1$), $(m_x-3)$, $(m_y+1)$ upon receipt of the operation command signal $OP_l$, and sets the thus calculated new $k_x$ and new $k_y$ (new $m_x$, new $m_y$) in the register 201. A reference numeral 204 designates an arithmetic operation circuit for determining the $n_x, n_y$ through calculations expressed by the equations (5) and (6), using the new $k_x$, new $k_y$, new $m_x$ and new $m_y$, while a register for memorizing the $n_x$ and $n_y$ thus determined is denoted by a reference numeral 205.

In operation, numeral keys $K_k$ and $K_m$ of the ten-key type input deive are depressed to appoint the imaginary region. Thereafter, the "0" key or the decimal point key $K_p$ is depressed to give an order for enlargement or reduction of the scale of display. Finally, the execution key EK is depressed. In consequence, the circuit PZMC for calculating the picture origin point and magnification makes a judging and arithmetic operation in accordance with the flow chart shown in FIG. 11, under the control of the controller 113, thereby displaying the image on the cathode ray tube CRT at the enlarged or reduced scale.

As has been described, according to the invention, the picture surface such as cathode ray tube CRT is divided into a plurality of sub-regions so that it is possible to simply and promptly appoint the sub-region for the display of the image at enlarged or reduced scale.

Particularly, when the picture surface is divided into 9 sub-regions arranged in 3 lines and 3 columns, it is possible to obtain a sub-region arrangement Si which corresponds to the arrangement of numeral keys $K_i$ of the ten-key type input device. Such an arrangement provides, needless to say, an appointment of the sub-region that can be made extremely easily and promptly without fail. Generally, the information processing apparatus with the display function is provided with the ten-key type input system. According to the invention, it is possible to make an efficient use of this ten-key type input device as the key device for appointing the sub-region, so that the cost of the display system is reduced and the construction of the same is simplified remarkably.

It is also to be noted that, according to the invention, it is possible to obtain a display system which is easy to operate, because it is possible to enlarge the image in an intermediate sub-region (imaginary sub-region) between two adjacent sub-regions or to reduce the image in size to fit the above-mentioned intermediate or imaginary sub-region.

What we claim is:

1. An image display system comprising:
   a display device having a picture surface on which an image to be enlarged or reduced is formed, said picture surface being divided into m×n sub-regions arranged in m lines and n columns where m and n are integers;
   a plurality of numeral keys bearing different numerical values, said keys for appointing said sub-regions and for generating numerical values;
   an operation unit, operatively connected to said plurality of numeral keys, for making the numerical values input through said plurality of numeral keys correspond to said sub-regions and for generating a corresponding output; and
   a picture processing device, operatively connected to said operation unit and to said display device, for transmitting to said display device, upon receipt of the output from said operation unit, the image of the sub-region appointed by the numeral key input at an enlarged scale for display on said picture surface.

2. An image display system as claimed in claim 1, further comprising:
   an enlarge key, operatively connected to said operation unit, for generating an enlarge order signal for initiating display at an enlarged scale; and
   a reduce key, operatively connected to said operation unit, for generating a reduce order signal for initiating display at a reduced scale, whereby, as the reduce order signal for initiating display at reduced scale is input through said reduce key, said picture processing device reducing the image presented on said picture surface and transmitting the reduced image to be displayed in the sub-region appointed through said reduce key input into said display device.

3. An image display system as claimed in claim 1, wherein said display device has the number of sub-regions in the line direction equal to the number of sub-regions in the column direction, so that magnifications and reductions of m and 1/m, respectively, are obtained for the displays at enlarged and reduced scales, respectively.

4. An image display system as claimed in claim 1, wherein said display device has the sub-region at the line i and column j on said picture surface corresponding to the sub-region appointing key represented by a numerical value of $(i-1).m+j$, where i and j are integers.

5. An image display system as claimed in claim 1, wherein said picture processing unit has a picture origin point for the display at the enlarged scale calculated from data for the position of the sub-region in dependence upon the numerical value of the one of the plurality of numeral keys through which the appointing is made.

6. An image display system as claimed in claim 4, wherein said display device has said picture surface divided into 9 sub-regions arranged in 3 lines and 3 columns, and wherein said plurality of numeral keys for appointing said sub-regions is a ten-key type input device.

7. An image display system as claimed in claim 6, wherein said ten-key type input device has a "0" key for generating the enlarge order signal for initiating the display at an enlarged scale, and has a decimal point key for generating the reduce order signal for initiating the display at a reduced scale.

8. An image display system as claimed in claim 4, wherein said operation unit is adapted to appoint an imaginary sub-region having the same area as said sub-region and extending at least over said plurality of adjacent sub-regions and inputs are made through said plurality of numeral keys corresponding to a plurality of adjacent sub-regions of the picture surface.

9. An image display system comprising:
input means for inputting n×m sub-region appointment indicators, where n and m are integers, and for inputting a magnification indicator;
calculation means, operatively connected to said input means, for calculating a picture origination point and manification including:
a distribution circuit, operatively connected to said input means, for distributing the sub-region appointment indicators and the magnification indicator;
origination means, operatively connected to said distribution circuit, for calculating the picture origination point in dependence upon the sub-region appointment indicators; and
factor means, operatively connected to said distribution circuit and said origination means, for calculating a magnification factor and a calculation factor in dependence upon the magnification indicator; and
display means, operatively connected to said origination means and said factor means for storing the picture image divided into n×m sub-regions and for visually displaying an enlarged or reduced version of the picture image stored in dependence upon the picture origination point and the magnification factor, so that the picture image is displayed in a reduced or enlarged fashion in dependence upon the sub-region appointed and the magnification indicator and so that said sub-region appointed is displayed in a reduced or enlarged manner.

10. An image display system as claimed in claim 9, wherein said factor means comprises:
a judging circuit, operatively connected to said distribution circuit, for generating an enlarged or reduced signal in dependence upon the magnification indicator;
a magnification calculation circuit, operatively connected to said judging circuit, for generating the magnification factor and the calculation factor in dependence upon whether the enlarged or reduced signal is received; and
a register, operatively connected to said magnification calculation circuit and said origination means for storing and passing therethrough the magnification factor and the calculation factor.

11. An image display system as claimed in claim 9, wherein said origination means comprises:
a first register, operatively connected to said distribution circuit, for storing and passing therethrough one of the sub-region appointment indicators and for storing corresponding column and line indicators;
a judging circuit, operatively connected to said first register, for determining whether the column and line indicators indicate the sub-region appointed by the one of the sub-region appointment indicators and for generating a greater than signal when the column and line indicators do not indicate the sub-region appointed by the one of the sub-region appointment indicator and for generating a less than signal when the line and column indicators indicate the one of the sub-region appointed by the sub-region appointment indicators;
a first operation circuit, operatively connected to said judging circuit and said first register, for receiving the column and line indicators and for calculating new values for the column and line indicators whenever the greater than signal is received and for storing said new values in said first register as the column and line indicators;
a second operation circuit, operatively connected to said judging circuit and said factor means for calculating first and second lengths for each sub-region in dependence upon predetermined picture lengths and the magnification factor;
a second register, operatively connected to said second operation circuit, for storing and passing therethrough the first and second lengths;
a calculation circuit, operatively connected to said first register, said second operation circuit, said second register and said factor means for calculating the picture origination point in dependence upon a predetermined initial picture origination point, the first and second lengths, the column and line indicators and the calculation factor; and
a third register, operatively connected to said calculation circuit and said display means, for storing and passing therethrough the picture origination point, so that said display means displays an enlarged or reduced version of the picture image stored in dependence upon the picture origination point and the magnification factor.

12. An image display system as claimed in claim 9, wherein said origination means comprises:
a first register, operatively connected to said distribution circuit, for storing and passing therethrough at least two sub-region appointment indicators and for storing for each sub-region appointment indicator corresponding column and line indicators;

a judging circuit, operatively connected to said first register, for determining whether the corresponding column and line indicators indicate the sub-region appointed by the corresponding sub-region appointment indicator, for generating a corresponding greater than signal when the corresponding column and line indicators do not indicate the corresponding sub-region appointed by the corresponding sub-region appointment indicator and for generating a corresponding less than signal when the corresponding line and column indicators indicate the corresponding sub-region appointed by the corresponding sub-region appointment indicator;

a first operation circuit, operatively connected to said judging circuit and said first register, for receiving the corresponding column and line indicators and for calculating new values for the corresponding column and line indicators when the corresponding greater than signal is received and storing the new values as the corresponding column and line indicators;

an arithmetic circuit, operatively connected to said first register and said judging circuit, for calculating an imaginary column and line indicator in dependence upon the column and line indicators corresponding to said at least two sub-region appointment indicators when the corresponding less than signals are received;

a second register, operatively connected to said arithmetic circuit, for storing and passing therethrough the imaginary column and line indicators;

a second operation circuit, operatively connected to said arithmetic circuit and said factor means for calculating first and second lengths for an imaginary sub-region in dependence upon predetermined picture lengths and the magnification factor;

a third register, operatively connected to said second operation circuit, for storing and passing therethrough the first and second lengths;

a calculation circuit, operatively connected to said second register, said second operation circuit, said third register and said factor means for calculating the picture origination point in dependence upon a predetermined initial picture origination point, the first and second lengths, the imaginary column and line indicators and the calculation factor; and a fourth register, operatively connected to said calculation circuit and to said display means, for storing and passing therethrough the picture origination point, so that an imaginary sub-region between the sub-regions appointed by said at least two sub-region appointment indicators is displayed in an enlarged or reduced manner.

13. An image display system as claimed in claim 10, wherein said magnification calculation circuit calculates a magnification or reduction factor of m or 1/m, respectively, in dependence upon whether the enlarged signal or the reduced signal is received, respectively.

14. An image display system as claimed in claim 11 or 12, wherein m and n are equal to 3.

15. An image display system as claimed in claim 14, wherein said input means is a ten-key type key pad having numeral keys 0 through 9 and a decimal key, wherein said sub-region appointment indicators are the numeral keys 1 through 9 and the magnification indicator includes a reduction indicator and an enlarge indicator, wherein said enlarge indicator is the 0 numeral key and said reduction indicator is the decimal point key.

* * * * *

UNITED STATES PATENT AND TRADEMARK OFFICE
CERTIFICATE OF CORRECTION

PATENT NO. : 4,366,475
DATED : December 28, 1982
INVENTOR(S) : Hajimu Kishi et al It is certified that error appears in the above-identified patent and that said Letters Patent is hereby corrected as shown below:

Front page, [57] ABSTRACT, line 10, delete "to";
line 11, delete "make".

Column 1, line 21, after "able", insert --to--;
line 53, delete "a".

Column 3, line 20, ",..." should be --,...,--;
line 31, "keys" should be --key--;
line 65, "-1-" should be --(1)--;
line 67, "-2-" should be --(2)--;
line 68, "$k_0$" should be --k0--;
"-3-" should be --(3)--.

Column 4, line 18, "$k_0$" should be --k0--.

Column 8, line 33, "$k_0$" should be --k0--.

Column 9, line 44, "M" should be --m--;
line 50, ")ky" should be --(ky--;
line 61, "deive" should be --device--.

Column 11, line 46, "manification" should be --magnification--.

Signed and Sealed this

Twenty-fifth Day of September 1984

[SEAL]

Attest:

GERALD J. MOSSINGHOFF

Attesting Officer

Commissioner of Patents and Trademarks